(12) United States Patent
Huras et al.

(10) Patent No.: US 7,099,897 B2
(45) Date of Patent: Aug. 29, 2006

(54) SYSTEM AND METHOD FOR DISCRIMINATORY REPLAYING OF LOG FILES DURING TABLESPACE RECOVERY IN A DATABASE MANAGEMENT SYSTEM

(75) Inventors: Matthew Albert Huras, Ajax (CA); Dale Murray McInnis, Aurora (CA); Effi Ofar, Thornhill (CA); Michael Jeffrey Winer, Markham (CA); Roger LQ. Zheng, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 10/425,804

(22) Filed: Apr. 29, 2003

(65) Prior Publication Data

US 2005/0278393 A1    Dec. 15, 2005

(30) Foreign Application Priority Data

Feb. 26, 2003  (CA) .................................... 2419883

(51) Int. Cl.
*G06F 17/30* (2006.01)

(52) U.S. Cl. ....................... 707/202; 707/200; 707/204; 714/16

(58) Field of Classification Search ................ 707/204, 707/202, 102; 714/16; 709/219
See application file for complete search history.

(56) References Cited

U.S. PATENT DOCUMENTS

| | | | |
|---|---|---|---|
| 5,638,508 A | 6/1997 | Kanai et al. | 395/182.18 |
| 5,850,508 A | 12/1998 | Lee et al. | 395/182.18 |
| 5,974,425 A * | 10/1999 | Obermarck et al. | 707/202 |
| 5,983,361 A | 11/1999 | Lee et al. | 714/19 |
| 6,052,695 A | 4/2000 | Abe et al. | 707/202 |
| 6,078,999 A | 6/2000 | Raju et al. | 711/161 |
| 6,144,999 A * | 11/2000 | Khalidi et al. | 709/219 |

(Continued)

FOREIGN PATENT DOCUMENTS

| | | |
|---|---|---|
| GB | 2361780 A | 10/2001 |
| JP | 9319638 A | 12/1997 |
| JP | 2000207265 A | 7/2000 |

OTHER PUBLICATIONS

Mohan et al., "Aries-RRH: Restricted Repeating of Hisotyr in the Aries Transaction Recovery Method," Data Engineering, 7th int'l. Coference, IEEE, pp. 718-727.*

(Continued)

*Primary Examiner*—Shahid Alam
*Assistant Examiner*—Tarik Koc
(74) *Attorney, Agent, or Firm*—Samuel A. Kassatly

(57) ABSTRACT

A system and an associated method selectively process log files for enhancing performance of tablespace recovery by processing only those log files required, and for selecting which log file to process during recovery for both redo and rollback phases of recovery. The system and method skip the processing of log files that do not contain records of interest for the tablespace being recovered and determines whether a log file contains anything that needs to be played, in particular for the recovery of a subsystem in the database, such as a tablespace. Pre processing of the log files is not done, rather including tablespace ID correlated with log file ID information is collected while the log files are created. The cross-correlated information is used during tablespace recovery to selectively determine which of the log files to process. Some log files may be skipped in cases where not all of the database system is being recovered. A sub set of the database can be recovered, such as a tablespace, and which log files to process is determined based on a lock instruction.

35 Claims, 8 Drawing Sheets

U.S. PATENT DOCUMENTS

| | | | |
|---|---|---|---|
| 6,175,732 B1 | 1/2001 | McDaniel et al. | 455/433 |
| 6,178,427 B1 | 1/2001 | Parker | 707/202 |
| 6,182,241 B1 * | 1/2001 | Ngai et al. | 714/16 |
| 6,185,577 B1 | 2/2001 | Nainani et al. | 707/202 |
| 6,289,355 B1 * | 9/2001 | Haderle et al. | 707/200 |
| 6,295,610 B1 | 9/2001 | Ganesh et al. | 714/19 |
| 6,578,041 B1 * | 6/2003 | Lomet | 707/102 |
| 2002/0007363 A1 | 1/2002 | Vaitzblit | 707/202 |

OTHER PUBLICATIONS

Margo Seltzer, "Transaction Support in a Log-Structured File System," Proceedings Ninth International Conference on Data Engineering, Apr. 19-23, 1993, Vienna, Austria, pp. 503-510.

* cited by examiner

| TABLE SPACE CHANGE HISTORY TABLE 215 | | |
|---|---|---|
| COMPLETE INDICATOR 402 | LOG FILE INDICATOR 404 | TABLE SPACES MODIFIED 406 |
| | | |
| | ... | |
| | 9 | |
| | 10 | 1, 2, 3, 4 |
| | 11 | 1, 2, 3, 4 |
| | 12 | 2, 3, 4 |
| | 13 | 2, 4 |
| | ... | |
| | | |
| | | |
| | | |
| | | |
| | | |
| | | |

FIG. 4

SYSTEM AND METHOD FOR DISCRIMINATORY REPLAYING OF LOG FILES DURING TABLESPACE RECOVERY IN A DATABASE MANAGEMENT SYSTEM

PRIORITY CLAIM

The present application claims the priority of Canadian patent application, Serial No. 2,419,883, titled "Discriminatory Replay of Log Files During Table Space Recovery in a Database Management System," which was filed on Feb. 26, 2003, and which is incorporated herein by reference.

FIELD OF THE INVENTION

The present invention relates to database management systems. More specifically, the present invention relates to discriminatory replay of log files during recovery in a database management system.

BACKGROUND OF THE INVENTION

A database management system (DBMS) is a software system that facilitates the creation, maintenance, and use of an electronic database. The software system is a suite of programs that typically manage large structured sets of persistent data, offering ad hoc query facilities to many users. The DBMS controls the organization, storage and retrieval of data (fields, records and files) in the database. The DBMS also controls the security and integrity of the database. The DBMS accepts requests for data from an application program and instructs the operating system to transfer appropriate data as requested.

When the DBMS is used, information systems can be changed much more easily as the organization's information requirements change. New categories of data can be added to the database without disruption to the existing system. Data security can prevent unauthorized users from viewing or updating the database. Using passwords, users are allowed access to the entire database or a series of database subsets, called sub-schemas or tablespaces. For example, an employee database can contain all the data about an individual employee, but one group of users may be authorized to view only payroll data, while others are allowed access to only work history and medical data of the employee database. The DBMS can maintain the integrity of the database through locks by not allowing more than one user to update the same record at the same time. The DBMS can keep duplicate records out of the database; for example, no two customers with the same customer numbers (key fields) can be entered into the database.

Query languages and report writers allow users to interactively interrogate the database and analyze its data. If the DBMS provides a way to interactively enter and update the database as well as interrogate it, this capability allows for managing personal databases. However, the DBMS may not leave an audit trail of actions or provide the kinds of controls necessary in a multi-user organization. These controls may only be available when a set of the application programs are customized for each data entry and updating function. For example, a business information system can be made up of subjects (customers, employees, vendors, etc.) and activities (orders, payments, purchases, etc.). Database design is the process of deciding how to organize this data into record types and how the record types will relate to each other.

The DBMS should mirror the organization's data structure and process transactions efficiently. Organizations may use one kind of DBMS for daily transaction processing and then move the detail onto another computer that uses another DBMS better suited for random inquiries and analysis. Overall system design decisions can be performed by data administrators and systems analysts. Detailed database design can be performed by database administrators. Three common organizations are hierarchical databases, network databases, and relational databases. A database management system may provide one, two or all three methods. Inverted lists and other methods can also be used. The most suitable database structure can depend on the application, on the transaction rate, and the number of inquiries made.

Known DBMSs may organize multiple tablespaces and store tables of the database. To recover selected tablespaces in the event of a system crash, a backup image of the database or the tablespace is restored followed by rolling forward through the log files that were created since the backup was taken. Log files contain log records that describe the changes made to the data currently stored in the database. Each log file contains one or more log records that apply to one or more tablespaces. Current recovery protocols either process or preprocess each log file during an operation for recovering the tablespace. However, one disadvantage of these protocols is that only those log records that apply to the tablespace being recovered need be processed. Therefore, processing all potential log files can result in inefficiencies concerning log file access and use. For example, if there was only one transaction that affected the tablespace being recovered, and that transaction existed in the life span of only one log file, all the log files will still be processed. Consequently, much time can be wasted in the current recovery protocols. Regardless of whether the log file contains transactions that are relevant for the tablespace being recovered, that log file will be processed as part of the recovery if was created between the start of the backup being recovered and the point in time to which the recovery is made.

For example, referring to European Patent Application No. 2002/0007363 A1, it describes a system and a method for processing through all log files but filtering the ones it actually plays. This system is required to review all the log files in order to select specific objects to recover. This system can be inefficient and inconvenient; processing time can be wasted when the system cannot skip the processing of log files that do not contain records of interest for the tablespace being recovered.

Referring to U.S. Pat. No. 6,185,577, it describes a system and a method for determining whether a rollback record has already been played. However, this system does not determine if the record needs to be played but assumes that it does. A function is described for storing multiple actions to be played within a single log record. Disadvantageously, this system cannot selectively process log files, which can result in wasting processing time on correlation operations. Furthermore, the system cannot ascertain whether the log file contains anything that needs to be played.

Referring to U.S. Pat. No. 6,182,241, it describes a method for recovering a system that terminated unexpectedly. The recovery operation includes partial processing and postponing the full processing of some non-terminated transactions to a later stage. One disadvantage is that all non-terminated transactions and therefore log records have to be processed eventually. Inconveniently, there is no way to skip processing of any log files or log records of non-terminated transactions. This system can also be inconvenient because it does not recover the subsystems in the database (i.e. tablespaces).

Referring to U.S. Pat. No. 6,178,427, it describes a system and a method for dealing with mirroring log files and then extracting relevant log records from the log files so that only the tablespaces being recovered are processed. However, the log files require processing prior to actual recovery in order to make it possible to skip log records by determining those specific files that may not be needed. This system can be inconvenient because it requires preprocessing of the log file.

Referring to U.S. Pat. No. 6,052,695, it describes a recovery mechanism for a distributed system. All the log files that contain transactions after the failure must be processed. This arrangement can be inconvenient because irrelevant files are not skipped, causing additional processing time.

Thus, there is need for a system and associated method that identify and selectively replay only those log files needed for database recovery. The need for such a system and method has heretofore remained unsatisfied.

SUMMARY OF THE INVENTION

The present invention satisfies this need, and presents a system, a computer program product, and an associated method (collectively referred to herein as "the system" or "the present system") to selectively replay log files for database recovery.

The present invention provides a method and a system for discriminatory replay of log files during tablespace recovery in a database management system by identifying which log files to process during the recovery. Log files are read and processed only if they contain log records relevant to the tablespace being recovered. To know which log files are required for a given tablespace recovery, information cross correlating the log files with the tablespaces modified is maintained during run time. The information contains the list of tablespaces (also referred to herein as table spaces) that are affected by each log file. This correlation information is written to a flat file (although could be written into the database itself).

During recovery, before processing a given log file, the correlation information collected during the run time is checked to verify that the selected log file is really needed for the recovery. To identify which tablespaces are affected by a given log file, each transaction maintains correlation information on tablespaces that it modifies. The transaction level correlation information is collected after determining the intent to change tablespaces based on lock intent. When a transaction terminates (commit or aborts), the correlation information is collected to an aggregation process.

This process aggregates the correlation information sent to it from all the transactions. Therefore, when a selected log file becomes inactive, all the transactions that wrote log records in the life span of the log file have their correlation information uploaded to the aggregate process. At this point, the process writes out the correlation information for the log file that became inactive.

According to the present invention there is provided a method for directing the database management system to recover a selected tablespace. This method comprises the steps of: monitoring an executing transaction having an intention to modify data stored in the tablespace based on lock intent of the transactions, the modified data represented by the contents of the log file having a log file identifier; collecting correlation information related to the modified data, the correlation information including a tablespace identifier of the modified tablespace correlated with the log file identifier; aggregating the correlation information related to the modified data; and selectively using the aggregated correlation information to discriminately execute selectable transactions logged in the log file against the backup version of the tablespace by matching the log file identifier with the tablespace identifier. This method is provided for a database management system having a database, a tablespace contained in the database, a backup version of the tablespace contained in the database, and a log file representing changes made to the tablespace as a result of transaction executed against the tablespace subsequent to the making of the backup version.

According to a further aspect of the present invention there is provided a computer program product having a computer-readable medium tangibly embodying computer executable instructions for directing a database management system to recover a selected tablespace, the computer program product comprising: computer readable code for monitoring an executing transaction having an intention to modify data stored in the tablespace based on lock intent of the transactions, the modified data represented by the contents of the log file having a log file identifier; computer readable code for collecting correlation information related to the modified data, the correlation information including a tablespace identifier of the modified tablespace correlated with the log file identifier; computer readable code for aggregating the correlation information related to the modified data; and computer readable code for selectively using the aggregated correlation information to discriminately execute selectable transactions logged in the log file against the backup version of the tablespace by matching the log file identifier with the tablespace identifier. This computer program product is provided for a database management system having a database, a tablespace contained in the database, a backup version of the tablespace contained in the database, and a log file representing changes made to the tablespace as a result of transaction executed against the tablespace subsequent to the making of the backup version.

According to a further aspect of the present invention there is provided an article comprising a computer-readable signal-bearing medium usable on a network, and also comprising means in the medium for directing a database management system to recover a selected tablespace. The article comprises: means in the medium for monitoring an executing transaction having an intention to modify data stored in the tablespace based on lock intent of the transactions, the modified data represented by the contents of the log file having a log file identifier; means in the medium for collecting correlation information related to the modified data, the correlation information including a tablespace identifier of the modified tablespace correlated with the log file identifier; means in the medium for aggregating the correlation information related to the modified data; and means in the medium for selectively using the aggregated correlation information to discriminately execute selectable transactions logged in the log file against the backup version of the tablespace by matching the log file identifier with the tablespace identifier. This article is provided for a database management system having a database, a tablespace contained in the database, a backup version of the tablespace contained in the database, and a log file representing changes made to the tablespace as a result of transaction executed against the tablespace subsequent to the making of the backup version.

According to a further aspect of the present invention there is provided a database management system that has a database, a tablespace contained in the database, a backup version of the tablespace contained in the database, and a log file representing changes made to the tablespace as a result of a transaction executed against the tablespace subsequent to the making of the backup version. The database management system is adapted to recover a selected tablespace. The database management system comprises: a transaction code module for monitoring an executing transaction having an intention to modify data stored in the tablespace based on lock intent of the transactions, the modified data represented by the contents of the log file having a log file identifier; the transaction code module collecting correlation information related to the modified data, the correlation information including a tablespace identifier of the modified tablespace correlated with the log file identifier; an aggregator code module for aggregating the correlation information related to the modified data; and a tablespace recovery code module for selectively using the aggregated correlation information to discriminately execute selectable transactions logged in the log file contents against the backup version of the tablespace by matching the log file identifier with the tablespace identifier.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 4 is a table showing a tablespace change history file of a database management system of FIG. 2;

DETAILED DESCRIPTION OF PREFERRED EMBODIMENTS

The following detailed description of the embodiments of the present invention does not limit the implementation of the invention to any particular computer programming language. The present invention may be implemented in any computer programming language provided that the OS (Operating System) provides the facilities that may support the requirements of the present invention. A preferred embodiment is implemented in the C or C++ computer programming language (or other computer programming languages in conjunction with C/C++). Any limitations presented would be a result of a particular type of operating system or computer programming language and would not be a limitation of the present invention.

Embodiments of the present invention provide a method, a data processing system, a computer program product, and/or an article for directing a database management system to recover a selected tablespace being contained in a database, the database being adapted to contain a backup version of the tablespace and a log file having contents being adapted to represent changes made to the tablespace subsequent to the backup version by at least one transaction executed by the database management system against the tablespace.

Other embodiments of the present invention provide a method, a data processing system, a computer program product, and/or an article for implementing a data structure usable in a recovery by a database management system of selected tablespaces contained in a database, the database being adapted to contain a backup version of the tablespaces and a plurality of log files having respective contents being adapted to represent changes made to the tablespaces subsequent to the backup version by at least one transaction executed by the database management system against the tablespaces, the transactions having an intent to modify the tablespaces based on lock intent.

The article can be a signal bearing medium for transporting computer readable code to a data processing system over a network, in which the code can be used to implement the method. The computer program product comprises a computer readable medium having computer executable code for directing a data processing system to implement the method. The computer program product can also be called a computer-readable memory, in which the memory can be a CD, floppy disk or hard drive or any sort of memory device usable by a data processing system. A data processing system may be configured to operate the method (either by use of computer executable code residing in a medium or by use of dedicated hardware modules, also generally or generically known as mechanisms or means, which may operate in an equivalent manner to the code which is well known in the art).

Figure 1:
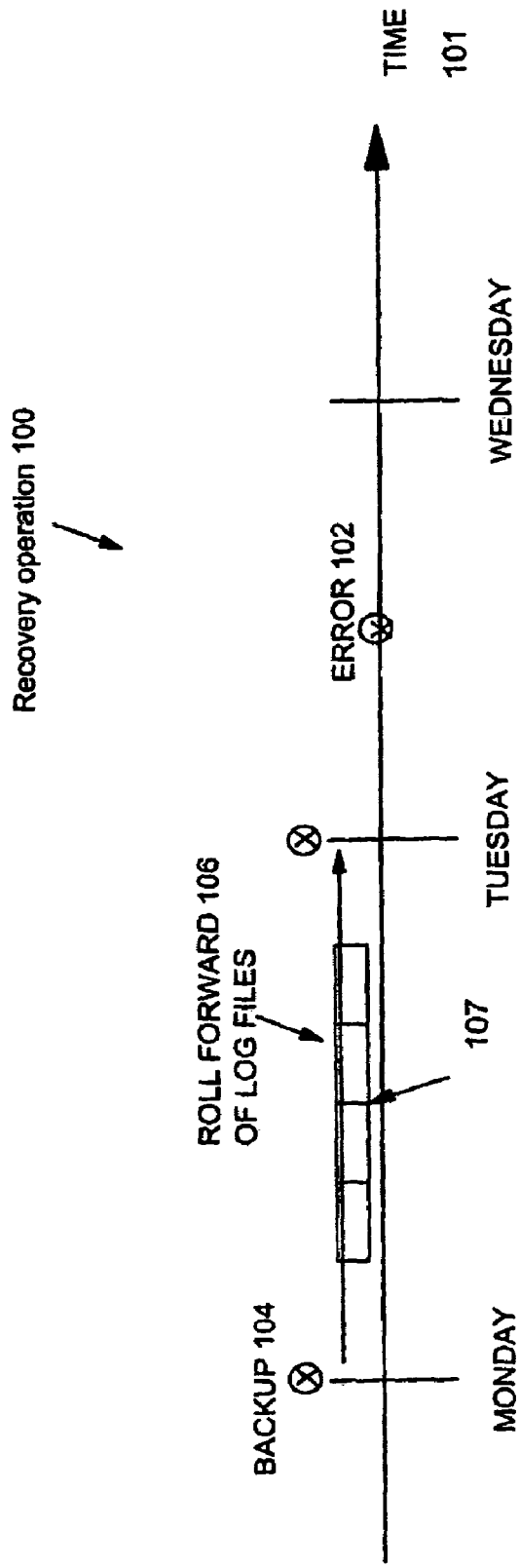
FIG. 1 is a diagram illustrating an operation for recovering a tablespace to a point in time.

FIG. 1 illustrates an exemplary recovery operation 100 for recovering a tablespace of a database to a point in time 101. For example, sometime between Tuesday and Wednesday a database administrator detects that an error 102 has occurred within the tablespace. A database management system (see FIG. 2) is used to recover the tablespace with minimal errors by restoring a backup version of the tablespace (indicated as backup 104), from Monday. The database management system obtains the backup 104 of the tablespace and begins a roll forward operation, roll forward 106 of selected log files 107 to the beginning of Tuesday.

Each log file 107 can contain many log records. Each log record records a transaction that interacted with the various tablespaces contained in the database. Typically, roll forward 106 can comprise processing selected log files in a serial manner, such as starting from one log file (e.g., log file #10) and onwards to a succeeding log file (e.g., log file #14) in a discriminatory manner as further described below.

Figure 2:
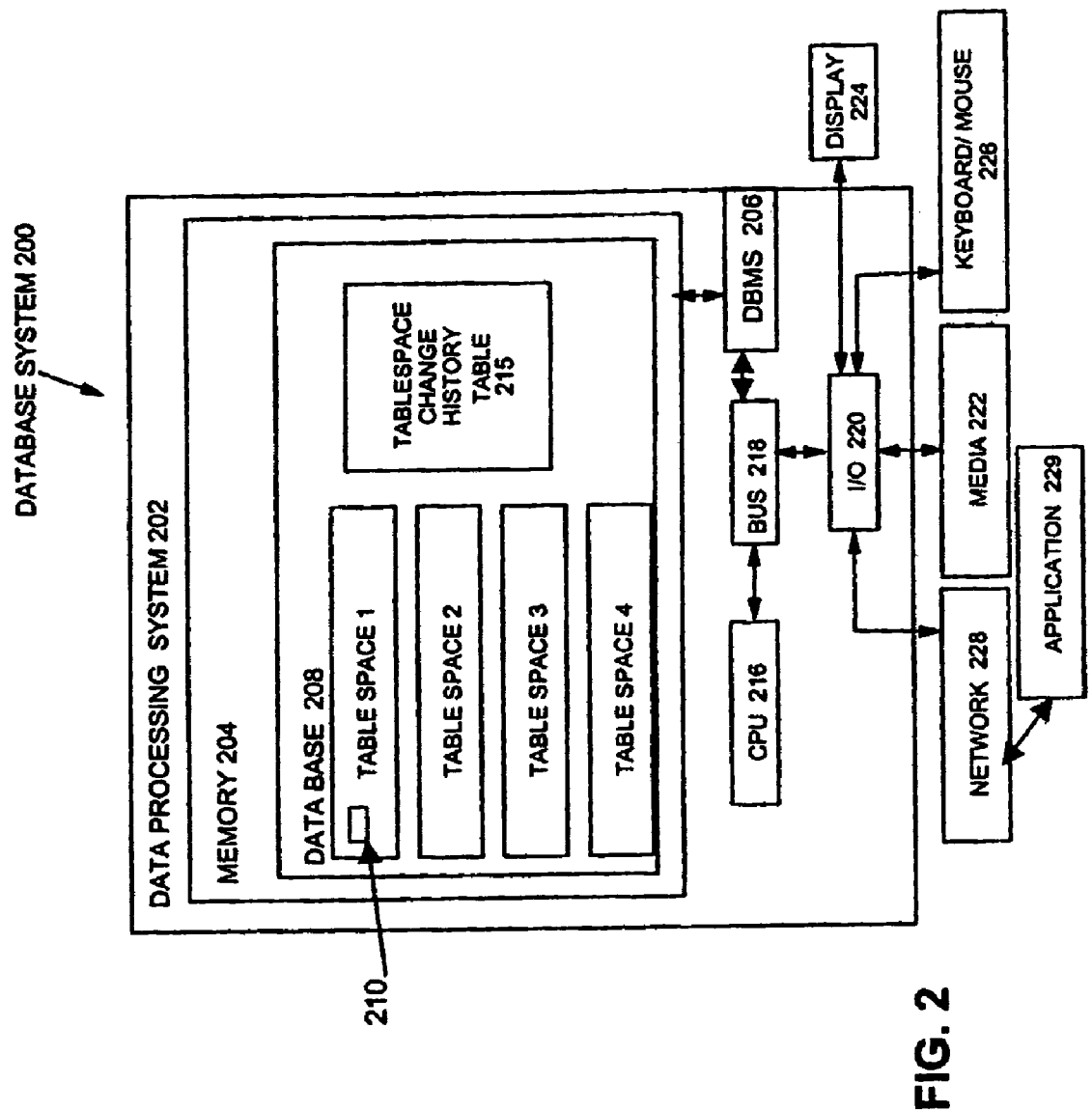
FIG. 2 is a schematic illustration of an exemplary database system in which a system and method for discriminatory replay of log files during tablespace recovery in a database management system of the present invention can be used.

FIG. 2 illustrates a database system 200 implemented in a data processing system 202 having memory 204 coupled to a bus 218. Coupled to bus 218 are other components, such as a CPU (Central Processing Unit) 216 and I/O subsystem 220. CPU 216 executes instructions stored in memory 204, such as a DBMS (Database Management System) 206. Operatively coupled to an I/O subsystem (I/O 220) is a network 228, a media 222, a keyboard/mouse 226, and a display 224, all known in the art. The media 222 may include code (such as the DBMS 206) that may be transferred for resident storage in the memory 204 via I/O 220 and the bus 218. Also stored in the memory 204 is a database 208 including a collection of tablespaces 1, 2, 3, 4, and a tablespace change history table 215. Further, application programs (application 229) can interact with the database 208 over the network 228. Application 229 requests data objects such as database objects 210 and their modification during interaction with the database 208. It is noted that the tablespaces 1, 2, 3, 4 can include stored database object 210 as organized and managed by the DBMS 206. The interaction of the DBMS 206 and tablespace change history table 215 will be described below in greater detail.

Database system 200 may be stored in the memory 204 of data processing system 202 or stored in a distributed data processing system (not depicted). Data processing system 202 comprises the CPU 216 (central processing unit) operatively coupled to memory 204, which also stores an operating system (not depicted) for general management of the data processing system 202. The database system 200 comprises computer executable programmed instructions for directing the data processing system 202 to implement embodiments of the methods of the present system and data processing systems 202 having means for implementing those methods. The programmed instructions can be embodied on a computer readable medium (such as but not limited to a CD disk or floppy disk) that may be used for transporting the programmed instructions to the memory 204 of data processing system 202. Alternatively, the programmed instructions may be embedded in a computer-readable, signal-bearing medium that is uploaded to the network 228 by a vendor or supplier of the programmed instructions, and this signal-bearing medium may be downloaded to the data processing system 202 from the network 228 by such as but not limited to end users or potential buyers.

It will be appreciated that a desirable aspect of the invention may be provided by a computer program product having a computer-readable medium tangibly embodying computer executable instructions for directing the data processing system 202 to implement any method or data processing system 202 to be described below. It will be appreciated that the computer program product may be a floppy disk, hard disk or other medium for long term storage of the computer executable instructions.

It will be appreciated that an aspect of the invention may be provided by an article having a computer-readable signal-bearing medium, and having means in the medium for directing the data processing system 202 to implement any method to be described below. It will be appreciated that a supplier of the embodiment of the invention may upload the article to the network 228 (such as the Internet) and users may download the article via the network 228 to their respective data processing systems 202.

Figure 3:
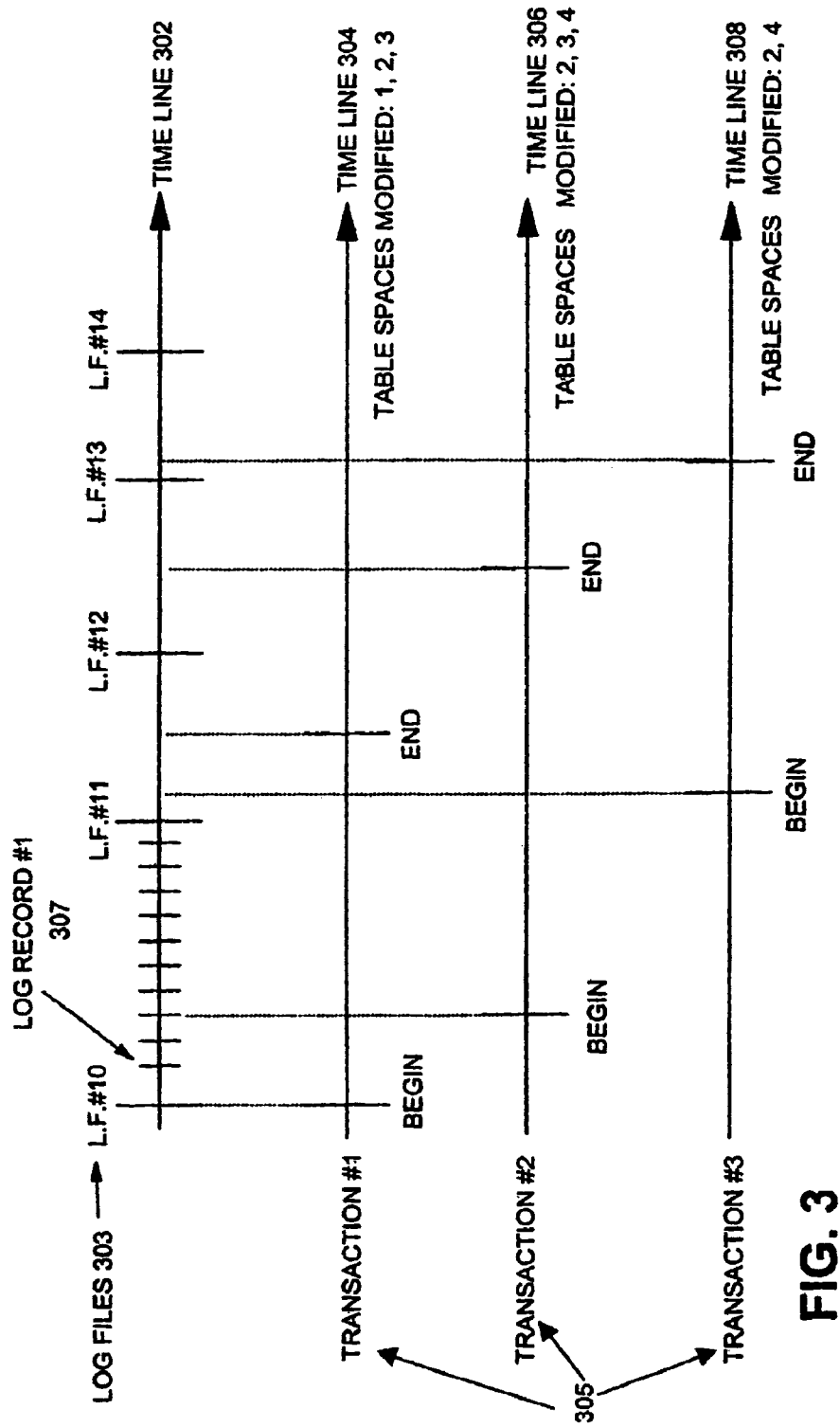
FIG. 3 is a diagram illustrating a timeline of log files and transactions within the database system of FIG. 2.

FIG. 3 shows exemplary timelines of log files 303 and transactions 305 realized within the database system 200 of FIG. 2. Log files 303 contain log records 307 that describe the changes made to the database objects 210 currently stored in the database 208. Each log file 303 contains one or more log records 307 that apply to one or more tablespaces 1, 2, 3, 4. During an operation for recovering selected tablespaces 1, 2, 3, 4, the log files 303 are selectively read, as further described below, with those records 307 processed that apply to the tablespace 1, 2, 3, 4 being recovered.

Referring again to FIG. 3, time line 302 shows the log files 303 that collect tracking information (that is, information about changes made to various tablespaces 1, 2, 3, 4 by various transactions 305). For example, log file #10 (L. F. #10) is opened and begins collecting tracking information into its set of log records 307. Each log record 307 includes the tracking details of an operation or transaction 305, that affects one or more tablespaces 1, 2, 3, 4. For example, once log file #10 is filled, log file #11 (L. F. #11) is opened and begins collecting additional transaction information. The transaction information collection process repeats for remaining log files 303, such as log files #12, #13, and #14 (L. F. #12, L. F. #13, and L. F. #14).

Time line 304 shows the start and end of transaction #1. The actions performed by transaction #1 are recorded in the log records 307 associated with log file #10 and log file #11. By way of example, transaction #1 modifies tablespaces 1, 2, and 3. Similarly, time line 306 shows the start and end of transaction #2. The actions performed by transaction #2 are recorded in the log records 307 associated with log file #10, log file #11, and log file #12. By way of example, transaction #2 modifies tablespaces 2, 3, and 4. Time line 308 shows the start and end of transaction #3. The actions performed by transaction #3 are recorded in the log records 307 associated with log file #11, log file #12, and log file #13. By way of example, transaction #3 modifies tablespaces 2 and 4.

For the transaction information collected in the log files 303, it is important to ensure the ACID (Atomicity, Consistency, Isolation, and Durability) properties of the database 208. This transaction information is useful if the transaction 305 is to be rolled back as well as for reply during database 208 and tablespace 1, 2, 3, 4 recovery after a restore or a database system 200 crash. Concurrency control and locking is the mechanism used by the DBMS 206 for the sharing of database objects 210. Atomicity, consistency, and isolation are achieved through concurrency control and locking, when many users may be reading the same database object 210 at the same time from the database 208. It is usually necessary to ensure that only one application 229 at a time can change selected database objects 210, achieved by locking.

Consequently, all changes to the particular database object 210 will be made in the correct order during concurrent transactions 305. For example, the amount of database objects 210 that can be locked with a single instance (transaction 305) or groups of instances (transactions 305) defines the granularity of the lock. In general, the types of granularity comprise page locking, cluster locking, class or table locking, and object or instance (transaction 305) locking.

Referring to FIG. 4, the tablespace change history table 215 is contained within the database system 200 of FIG. 2. Tablespace change history table 215 is a data structure for recording the tablespaces 1, 2, 3, 4 that are modified by the log records 307 in specific log files 303. The tablespace change history table 215 comprises history records 400 that comprise three fields, namely complete indicator 402, log file indicator 404, and table spaces modified 406. The log file indicator 404 contains the specific log file ID 407 of the log file 303 for which the record 400 applies. The tablespace modified 406 contains the list of tablespace IDs 408 that are modified by the log records 307 in the log file 303 indicated by the log file indicator 404. The complete indicator 402 is used to record whether the information collected for the log file 303 referenced in the log file indicator 404 is complete. The correlated information of the tablespace change history table 215 contains the tablespace IDs 408 of specific tablespaces 1, 2, 3, 4 and the associated log file IDs 407 of the specific log files 303 used to record the modifications of the tablespace 1, 2, 3, 4 by the log records 307.

In the example shown in FIGS. 3 and 4, the specific log file #10 contains log records 307 that modify tablespaces 1, 2, 3 and 4. This corresponds to the information shown in FIG. 3, where transaction #1 and transaction #2 are active during the life span of log file #10. As described above, transaction #1 modified tablespaces 1, 2 and 3, while transaction #2 modified tablespaces 2,3, and 4. Together transaction #1 and transaction #2 modified tablespaces 1, 2, 3 and 4.

Referring again to FIGS. 3 and 4, the specific log file #11 contains log records 307 that modify tablespaces 1, 2, 3 and 4. This corresponds to the information shown in FIG. 3, where transactions #1, #2 and #3 were active during the life span of log file #11. Accordingly: transaction #1 modified tablespaces 1,2 and 3; Transaction #2 modified tablespaces 2,3, and 4; and Transaction #3 modified tablespaces 2 and 4. Together, transactions #1, #2, #3 modified tablespaces 1, 2, 3 and 4.

Similarly, FIGS. 3 and 4 show the specific log file #12 to contain log records 307 that modify tablespaces 2,3 and 4. This corresponds to the information shown in FIG. 3, where transactions #2 and #3 were active during the life span of log file 12. It should be noted that transaction #1 was no longer active during the life span of log file #12 because it was finished during log file #11. Accordingly: transaction #2 modified tablespaces 2,3, and 4; and transaction #3 modified tablespaces 2 and 4. Together these two transactions modified tablespaces 2,3 and 4.

FIGS. 3 and 4 show the specific log file #13 containing log records 307 that modify tablespaces 2 and 4. This corresponds to the information shown in FIG. 3, where only transaction #3 was active during the life span of log file #13. Transaction #2 was no longer active during the life span of log file #13 because it was finished during log file #12. Accordingly, transaction #3 modified tablespaces 2 and 4. Consequently, only tablespaces 2 and 4 are shown to be modified in the life span of log file #13.

Referring again to FIG. 4, the complete indicator 402 indicates that when the correlation information in the tablespace change history table 215 is used during recovery, only those records 400 are used that correspond to log files 303 for which all the tracking information (i.e. database object 210 modification information) has been collected. In an alternative embodiment, the complete indicator 402 may be removed because the record 400 for a given file 303 is written to the tablespace change history table 215 only when all the information for that given file 303 has been collected and stored in its log records 307.

Figure 5:
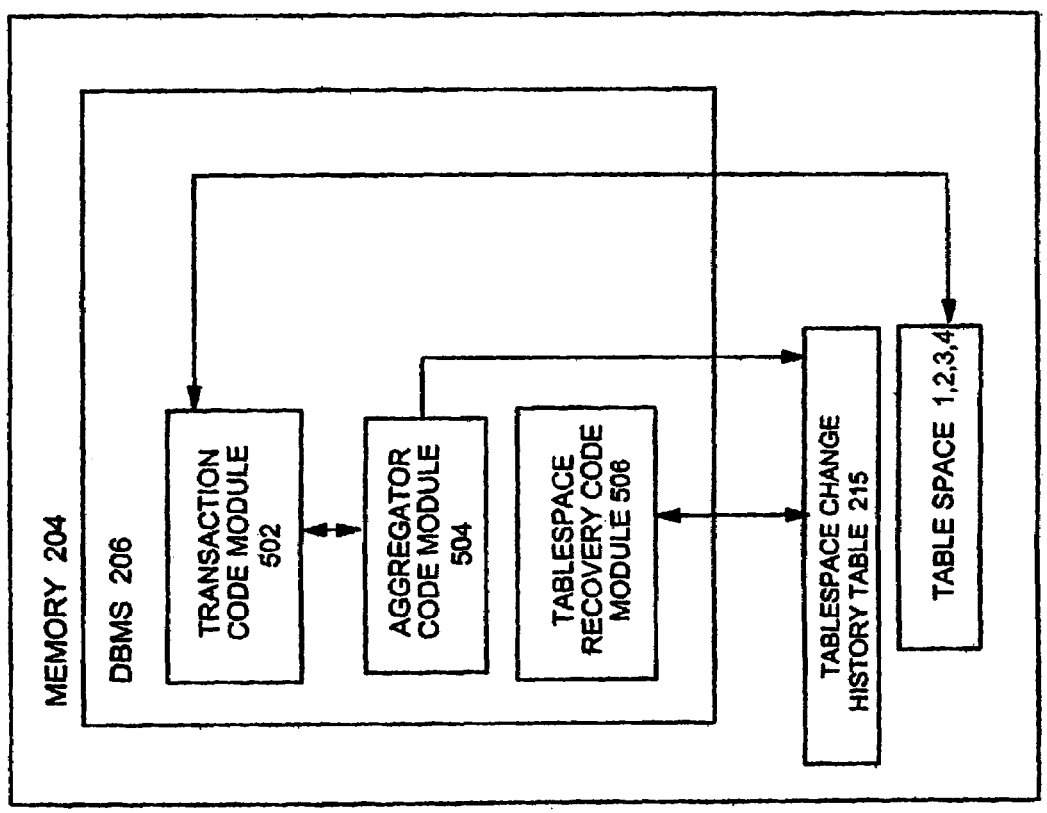
FIG. 5 is a block diagram illustrating modular components of the database management system of FIG. 2.

FIG. 5 shows a transaction code module 502, an aggregator code module 504, and a tablespace recovery code module 506 included with the DBMS 206 of FIG. 2. Operation of the transaction code module 502 is described in greater detail in operation S600 of FIG. 6. Operation of the aggregator code module 504 is described in greater detail in operation S700 of FIG. 7. Operation of the tablespace recovery code module 506 is described in greater detail in operation S800 of FIG. 8.

Generally, the transaction code module 502 will interact with the selected tablespaces 1, 2, 3, 4 as they are modified, and then provide tablespace change history information to the aggregator code module 504. That correlation information will be eventually stored in the tablespace change history table 215. Aggregator code module 504 receives the correlation information and transfers this information to the tablespace change history table 215. For example, when a database administrator needs to restore specific tablespaces 1, 2, 3, 4 in the event of a database system 200 crash, the DBMS 206 executes tablespace recovery code module 506 to use the history records 400 of the tablespace change history table 215.

Therefore, the transaction code module 502 and the aggregator code module 504 of the DBMS 206 are used to collect and update the history records 400 of the tablespace change history table 215 as the selected tablespaces 1, 2, 3, 4 are modified. When desired, the DBMS 206 uses the tablespace recovery code module 506 to process the specific log files 303 listed in the tablespace change history table 215. The log records 307 of the selected log files 303, identified by their log file IDs 407, are used to restore the correlated tablespaces 1, 2, 3, 4 by the DBMS 206.

Figure 6:
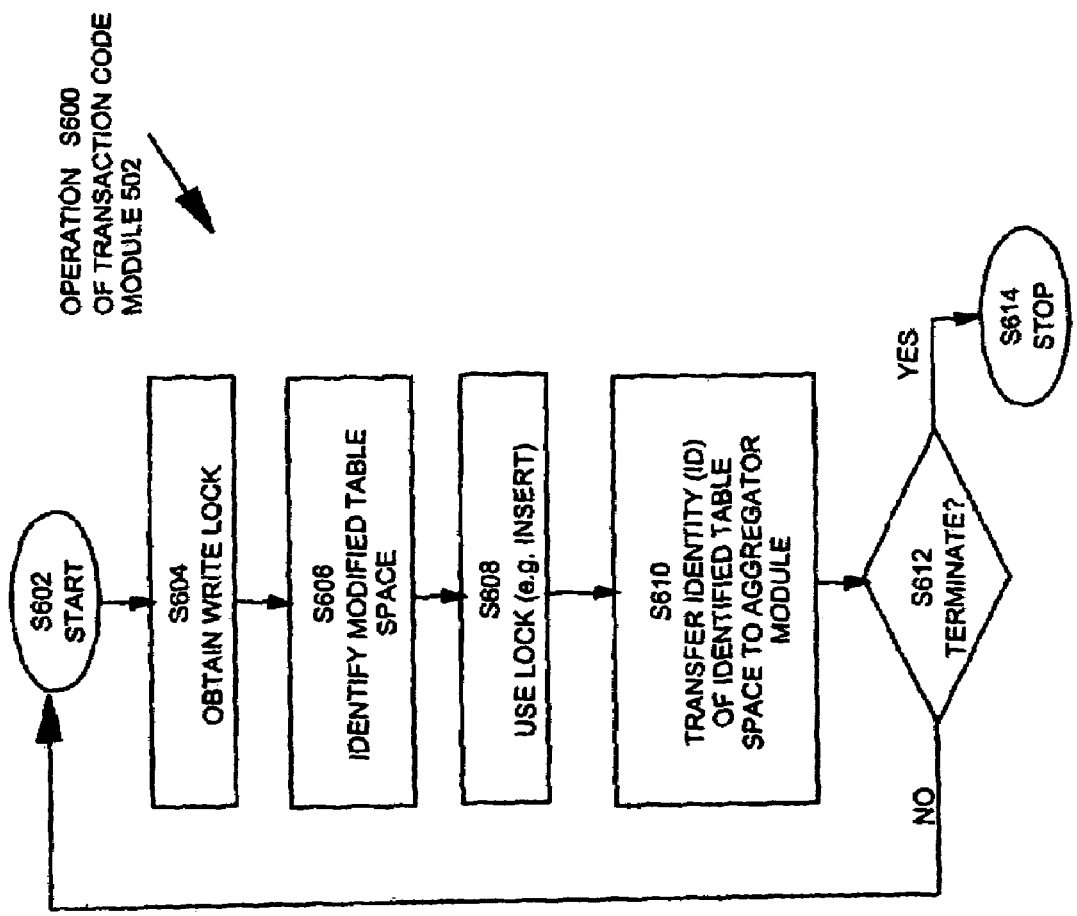
FIG. 6 is a process flow chart illustrating a method of operation of a transaction code module of FIG. 5.

FIG. 6 shows operation S600 of the transaction code module 502 of FIG. 5. Operation S600 comprises a life cycle of the transaction 305 adapted for interaction with the tablespace change history table 215 of FIGS. 2 and 4. The correlation information (including log file ID 407 with tablespace ID 408) indicates which tablespaces 1, 2, 3, 4 are being modified by the transaction 305. This correlation information is collected when the transaction 305 expresses an interest in obtaining an update lock on the selected tablespace 1, 2, 3, 4. This sort of lock is always obtained prior to modification of database objects 210 of the tablespace 1, 2, 3, 4. For example, locked database objects 210 can be identified by file and block number. Locks can be chained by both database object 210 and transaction 305 to facilitate traversal during transaction 305 commit and abort functions.

Referring to FIG. 6, operation S602 comprises starting operation S600 and operation S604 comprises obtaining a write lock. This sort of lock, also referenced as lock intent, is obtained whenever the database objects 210 in the database 208 are to be modified. Once the write lock is obtained, operation S606 comprises identifying the modified tablespace 1, 2, 3, 4. Identification is made by the code that obtains the lock. This sort of information is inherent in obtaining locks, since obtaining the lock requires a known identity of the database object 210 being locked.

Part of this information is in which tablespace 1, 2, 3, 4 the database object 210 resides. Operation S608 comprises using the lock to insert or otherwise modify database objects 210 associated with the tablespace 1, 2, 3, 4 selected in the database 208 To prevent multiple transactions from modifying the same database object 210 at the same time, the lock is obtained prior to modification. Once the lock is obtained, the transaction 305 can change the database object 210, such as but not limited to a row, a table, or some other object as needed.

Referring again to FIG. 6, operation S610 comprises transferring the identity (ID) (see FIG. 4) of identified tablespaces 1, 2, 3, 4 (tablespace ID 408) to the aggregator code module 504 (see FIG. 5). The tablespace ID 408 is collected as part of the state information of transaction 305. The transaction 305 maintains the list of all the tablespaces 1, 2, 3, 4 modified by the transaction 305. This list of tablespace IDs 408 is sent to the aggregator code module 504 during the termination of the transaction 305. Operation S612 determines whether to terminate operation S600. If termination of S600 is required, control proceeds to operation S614. If termination of operation S600 is not required, control is transferred to operation S602.

Operation S614 includes a stopping operation of the transaction code module 502. When the transaction 305 is stopped, all the correlation information that was collected by the transaction 305 is transferred to the aggregator code module 504 by the transaction code module 502. This correlation information includes the list of tablespace IDs 408 modified by the transaction 305, the associated log file IDs 407, as well as some other implicit information indicating when the transactions 305 started and ended (i.e. which span of the log files 303 was affected). The tablespace ID 408 of the tablespaces modified (plus the rest of the used state information) can be transferred by the transaction code module 502 such as but not limited to via a function call, a message queue, a remote procedure call, shared memory, or some other communication mechanism. It is noted the transaction state can be a per transaction structure, which describes the currently running transactions 305. Attributes of the transaction state can include such as but not limited to idle, running, aborting, and committing, associated log files 3030, a pointer to the chain of locks currently held, a transaction 305 identifier, and links to other transaction states.

Figure 7:
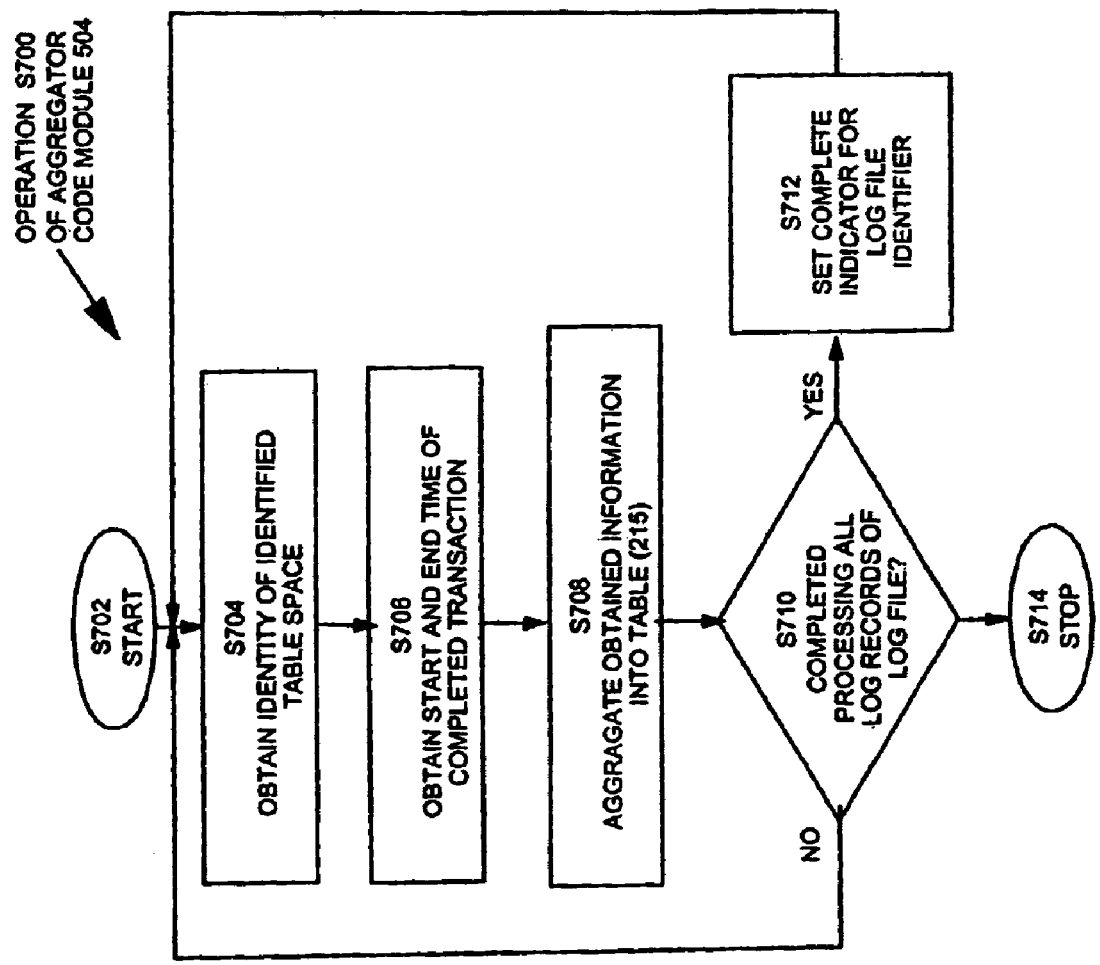
FIG. 7 is a process flow chart illustrating a method of operation of an aggregator code module of FIG. 5.

Once the tablespace ID 408 and the other state information (such as the log file IDs 407) is sent to the aggregator code module 504, referring to FIG. 7, the operation S700 includes collecting correlation information regarding which tablespaces 1, 2, 3, 4 are modified by which log files 303. Once all the correlation information for a given tablespace 1, 2, 3, 4 is collected (i.e. the information from all the transactions 305 that were alive during the life span of the log files 303), the log file complete indicator 402 is set as true. Alternatively, the log file information record 400 can simply be written out to the tablespace change history table 215 only when the correlation information has been fully collected.

Referring again to FIG. 7, operation S702 comprises starting the operation S700, and operation S704 includes obtaining the identity of identified is tablespaces 1, 2, 3, 4, tablespace ID 408. Operation S706 comprises obtaining start and end time of completed transaction 305 for correlating the log file IDs 407 of the affected log files 303. This correlation information is maintained as part of the state of the transaction 305 and is sent to the aggregator code module 504 when the transaction 305 terminates.

Operation S708 comprises aggregating the obtained correlation information into the appropriate record 400 of the tablespace change history table 215. Operation 8710 comprises determining whether processing of all log records 307 of the current log file 303 is completed. If processing of all log records 307 of the log file 303 has been completed, control is transferred to operation S712. If processing of all log records 307 of the log file 303 has not been completed, control is transferred to operation S704.

Operation S712 comprises setting the complete indicator 402 for log file IDs 407 in the tablespace change history table 215. Alternatively, operation S712 writes the record 400 for the corresponding log file 303 to disk (not shown) of the database 208. Operation S714 comprises a stopping operation of the aggregator code module 504.

Figure 8:
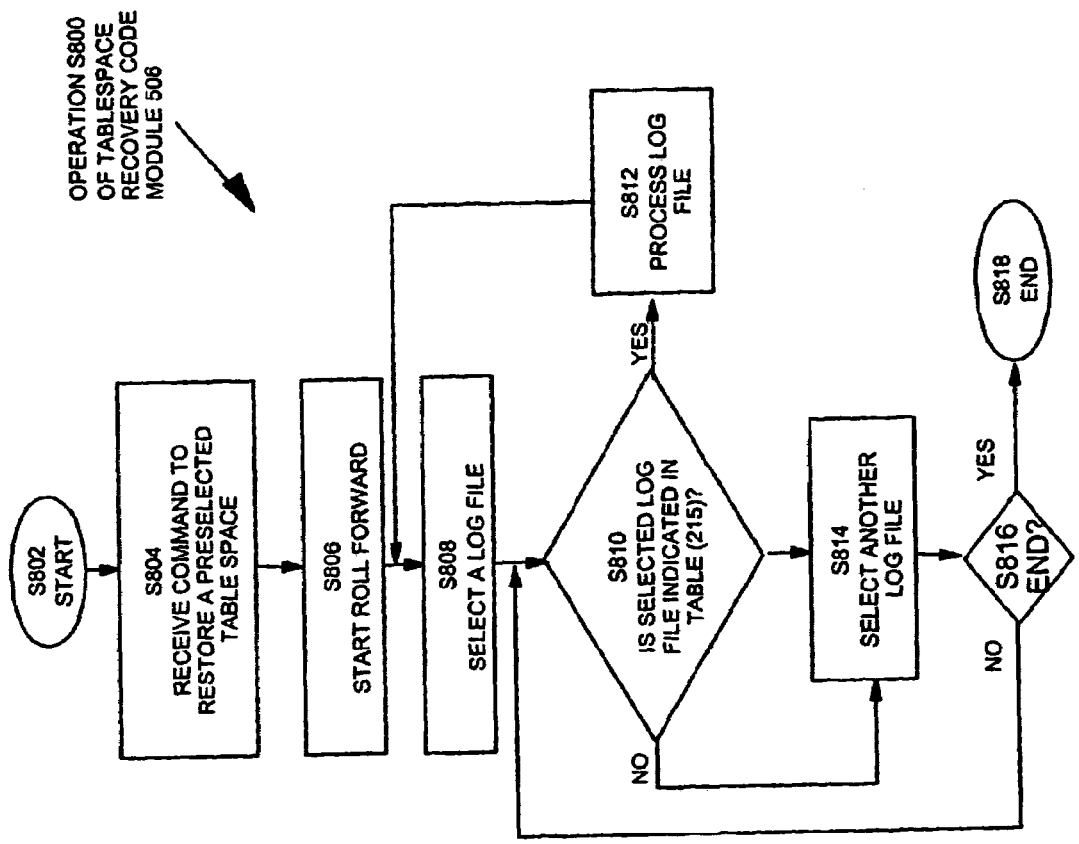
FIG. 8 is a process flow chart illustrating a method of operation of a tablespace recovery code module of FIG. 5.

Referring to FIG. 8, operation S800 of tablespace recovery code module 506 is shown. Operation S800 comprises recovering the selected tablespace 1, 2, 3, 4 and selectively processing the correlated log files 303 indicated by the log file IDs 407 in the list under heading log file indicator 404 of the tablespace change history table 215. Operation S802 comprises a starting operation of the tablespace recovery code module 506.

Operation S804 comprises receiving a command from the DBMS 206 to restore the selected tablespace 1, 2, 3, 4. Operation S806 comprises starting the roll forward operation, with operation S808 selecting the log file IDs 407 from the log file indicator 404. These log file IDs 407 are correlated with the tablespace 1, 2, 3, 4 as listed in the tablespaces modified 406. For example, specific log files #10 and #11 are only associated with recovering tablespace 1, while specific, log files #10, #11, #12 would be needed for recovering tablespace 3. Similarly, specific log files #10, #11, #12, #13 would be needed for recovering tablespaces 2 and 4. The first log file ID 407 to be selected is the first log file 303 that became active after the backup started.

Operation S810 comprises determining whether the selected log file 303 has its corresponding log file ID 407 listed in the tablespace 1, 2, 3, 4 change history table 215 for tablespace 1, 2, 3, 4. If yes, control is transferred to operation S812. If no, control is transferred to operation S814. If there is no record 400 in the tablespace change history table 215 for the selected log file ID 407, that log file ID 407 can be assumed necessary for the recovery.

Operation S812 comprises processing the selected log file 303; control is then transferred back to operation S808. Operation S814 comprises selecting another log file ID 407 for determining if listed in the tablespace change history table 215.The next log file ID 407 selected in the tablespace change history table 215 is the file 303 that became active after the current file 303. Operation S816 comprises determining whether to end operation S818 of the tablespace recovery code module 506. If operation S800 is to end, control is transferred to operation S818. If operation S800 is to continue, control is transferred to operation S810.

In an alternative embodiment of operation S800, an initial operation comprises selecting "select next log file ID 407" to process. Another operation comprises determining whether there is a log file ID 407 needed for recovery. If yes, the corresponding log file 303 is processed, and the next log file ID 407 is set to process to the next sequential log file 303. If no, then another log file ID 407 is selected from the tablespace change history table 215 for processing. Both subsequent yes/no branches continue to another operation that comprises determining whether there is a next log file 303 to process, corresponding to the log file ID 407 from the tablespace change history table 215. If yes, then go back to the "is log file 303 needed for recovery". If no, then end or stop operations are implemented.

Referring to FIGS. 1, 2, 4, and 5, recovery of the database objects 210 in the database system 200 uses the process of restoring the tablespace backup 104 and the process of rolling forward through all correlated log files 303 that contain the changes that took place after the backup 104 was recorded. The non-listed log files 303 are skipped in this process. The log files 303 are used to record the changes that occur to all tablespaces 1, 2, 3, 4 in the database system 200, through the series of log records 307. However, the operation roll forward 106 only uses those records 307 in the log files 303 that relate to the particular tablespace 1, 2, 3, 4 being rolled forward (i.e. recovered).

The database management system 206 notes when transactions 305 obtain locks on the database objects 210 within selected tablespaces 1, 2, 3, 4; these locks indicate an intention to perform a modification of the tablespace 1, 2, 3, 4. The DBMS 206 marks or otherwise correlates the transaction 305 with the associated log files 303 in the tablespace change history table 215, as modifying the tablespace 1, 2, 3, 4 in which the database objects 210 reside.

During the transaction 305 termination (such as commit or abort), the correlation information relating to the tablespaces 1, 2, 3, 4 being modified is monitored and recorded by the transaction code module 502 and aggregator code module 504. The transaction code module 502 and aggregator code module 504 assist in aggregating the correlation information collected from all transactions 305 of the database system 200 at the transaction level (i.e. log file 303 granularity). This information is recorded in the tablespace change history table 215, such as but not limited to a flat file. During recovery, the tablespace change history table 215 is processed to determine which log files 303 should be processed and which log files 303 should be skipped.

The method of selectively or discriminately replaying log files 303 by the DBMS 206 comprises; determining the intent to change data of database objects 210 by noting lock intent; collecting correlation information from all transactions 305 by marking each transaction 305 as modifying the tablespace 1, 2, 3, 4 in which the database object 210 resides; aggregating the correlation information from all the transactions 305 at a log file 303 level (log files granularity); and writing the information to the tablespace change history table 215. The DBMS 206 then uses the correlation information contained in the tablespace change history table 215 to selectively determine which of the log files 303 should be handled (and corresponding log records 307) during recovery of selected tablespaces 1, 2, 3, 4.

In a further embodiment, database machines can be specially designed computers for holding the actual database system 200 and run only the DBMS 206 and related software. Connected to one or more mainframes via a high-speed channel, the database machines can be used in large volume transaction processing environments. Database machines can have a large number of DBMS 206 functions built into the hardware and can also provide special techniques for accessing the disks (not shown) containing the databases 208, such as using multiple processors concurrently for high-speed searches. The database objects 210 can be made up of data, text, pictures and voice.

It will be appreciated that variations of some elements are possible to adapt the invention for specific conditions or functions. The concepts of the present invention can be further extended to a variety of other applications that are clearly within the scope of this invention. Having thus described the present invention with respect to a preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

What is claimed is:

1. A processor-implemented method for discriminatory replaying of a plurality of log files during database recovery in a database management system, comprising:
   monitoring executable transactions to modify data stored in a tablespace, based on an instruction to lock the executable transactions, wherein the data that has been modified is represented by a log file that comprises a log file identifier;
   collecting correlation information related to the modified data, wherein the correlation information comprises a tablespace identifier of the tablespace that is correlated with the log file identifier;
   aggregating the correlation information related to the modified data;
   matching the log file identifier with the tablespace identifier, against a backup version of the tablespace, to identify the monitored transactions that are logged in the log file and that need to be recovered during the database recovery; and
   selectively using the aggregated correlation information to exclusively execute the identified monitored transactions.

2. The method of claim 1, wherein the database management system comprises a database.

3. The method of claim 2, wherein the database contains the tablespace.

4. The method of claim 2, wherein the database contains the backup version of the tablespace.

5. The method of claim 1, wherein the aggregated correlated information of the executed transactions is aggregated at a log file granularity.

6. The method of claim 1, further comprising writing the aggregated correlation information to a transaction history table in a predefined format.

7. The method of claim 6, further comprising adapting the transaction history table to contain the correlation information having a list of correlated log file identifiers associated with the tablespace identifier.

8. The method of claim 7, further comprising processing the list of correlated log file identifiers in the history table, for selecting the log files that are associated with the tablespace.

9. The method of claim 8, further comprising processing the selected log files according to respectively selected log file identifiers, for recovering the tablespace.

10. The method of claim 9, wherein recovering the tablespace comprises rolling forward through all the selected log files from the list of correlated log file identifiers, and skipping the log files with log file identifiers that are not on the list of correlated log file identifiers associated with the tablespace.

11. The method of claim 6, further comprising adapting the aggregated correlation information to include multiple tablespace identifiers with correlated multiple log file identifiers.

12. The method of claim 6, wherein the aggregated correlation information comprises at least two log file identifiers correlated with the tablespace identifier.

13. The method of claim 7, wherein the predefined format comprises a listing of the log file identifiers and a listing of associated tablespace identifiers.

14. A computer program product having instruction codes stored on a computer useable medium, for discriminatory replaying of a plurality of log files during database recovery in a database management system, comprising:
   a set of instruction codes for monitoring executable transactions to modify data stored in a tablespace, based on an instruction to lock the executable transactions, wherein the data that has been modified is represented by a log file that comprises a log file identifier;
   a set of instruction codes for collecting correlation information related to the modified data, wherein the correlation information comprises a tablespace identifier of the tablespace that is correlated with the log file identifier;
   a set of instruction codes for aggregating the correlation information related to the modified data;
   a set on instruction codes for matching the log file identifier with the tablespace identifier, against a backup version of the tablespace, to identify the monitored transactions that are logged in the log file and that need to be recovered during the database recovery; and
   a set of instruction codes for selectively using the aggregated correlation information to exclusively execute the identified monitored transactions.

15. The computer program product of claim 14, wherein the database management system comprises a database.

16. The computer program product of claim 15, wherein the database contains the tablespace.

17. The computer program product of claim 15, wherein the database contains the backup version of the tablespace.

18. The computer program product of claim 14, wherein the aggregated correlated information of the executed transactions is aggregated at a log file granularity.

19. The computer program product of claim 14, further comprising a set of instruction codes for writing the aggregated correlation information to a transaction history table in a predefined format.

20. The computer program product of claim 19, further comprising a set of instruction codes for adapting the transaction history table to contain the correlation information having a list of correlated log file identifiers associated with the tablespace identifier.

21. The computer program product of claim 20, further comprising a set of instruction codes for processing the list of correlated log file identifiers in the history table, and for selecting the log files that are associated with the tablespace.

22. The computer program product of claim 21, wherein the set of instruction codes further processes the selected log files according to respectively selected log file identifiers, for recovering the tablespace.

23. The computer program product of claim 22, wherein the seventh set of instruction codes rolls forward through all the selected log files from the list of correlated log file identifiers, and further skips the log files with log file identifiers that are not on the list of correlated log file identifiers associated with the tablespace.

24. The computer program product of claim 19, wherein the set of instruction codes further adapts the aggregated correlation information to include multiple tablespace identifiers with correlated multiple log file identifiers.

25. The computer program product of claim 19, wherein the aggregated correlation information comprises at least two log file identifiers correlated with the tablespace identifier.

26. The computer program product of claim 20, wherein the predefined format comprises a listing of the log file identifiers and a listing of associated tablespace identifiers.

27. A processor-implemented system for discriminatory replaying of a plurality of log files during database recovery in a database management system, comprising:

means for monitoring executable transactions to modify data stored in a tablespace, based on an instruction to lock the executable transactions, wherein the data that has been modified is represented by a log file that comprises a log file identifier;

means for collecting correlation information related to the modified data, wherein the correlation information comprises a tablespace identifier of the tablespace that is correlated with the log file identifier;

means for aggregating the correlation information related to the modified data;

means for matching the log file identifier with the tablespace identifier, against a backup version of the tablespace, to identify the monitored transactions that are logged in the log file and that need to be recovered during the database recovery; and means for selectively using the aggregated correlation information to exclusively execute the identified monitored transactions.

28. The system of claim 27, further comprising means for writing the aggregated correlation information to a transaction history table in a predefined format.

29. The system of claim 28, further comprising means for adapting the transaction history table to contain the correlation information having a list of correlated log file identifiers associated with the tablespace identifier.

30. The system of claim 29, further comprising means for processing the list of correlated log file identifiers in the history table, and for selecting the log files that are associated with the tablespace.

31. The system of claim 30, wherein the processing means further processes the selected log files according to respectively selected log file identifiers, for recovering the tablespace.

32. The system of claim 31, wherein the processing means further rolls forward through all the selected log files from the list of correlated log file identifiers, and skips the log files with log file identifiers that are not on the list of correlated log file identifiers associated with the tablespace.

33. The system of claim 32, wherein the adapting means further adapts the aggregated correlation information to include multiple tablespace identifiers with correlated multiple log file identifiers.

34. The system of claim 33, wherein the aggregated correlation information comprises at least two log file identifiers correlated with the tablespace identifier.

35. The system of claim 34, wherein the predefined format comprises a listing of the log file identifiers and a listing of associated tablespace identifiers.

* * * * *

UNITED STATES PATENT AND TRADEMARK OFFICE
CERTIFICATE OF CORRECTION

| | | |
|---|---|---|
| PATENT NO. | : 7,099,897 B2 | Page 1 of 1 |
| APPLICATION NO. | : 10/425804 | |
| DATED | : August 29, 2006 | |
| INVENTOR(S) | : Matthew Huras et al. | |

It is certified that error appears in the above-identified patent and that said Letters Patent is hereby corrected as shown below:

On the Title Page, Item (75) one of the inventors' names is misspelled. The correct spelling of the inventor's name, indicated in the oath and declaration as filed, is as follows:

--Effi Ofer--

Signed and Sealed this

Fifth Day of June, 2007

JON W. DUDAS
*Director of the United States Patent and Trademark Office*